Aug. 17, 1954   M. S. ROUSH   2,686,654
COATED MEMBER AND METHOD OF MAKING THE SAME
Filed Oct. 19, 1948
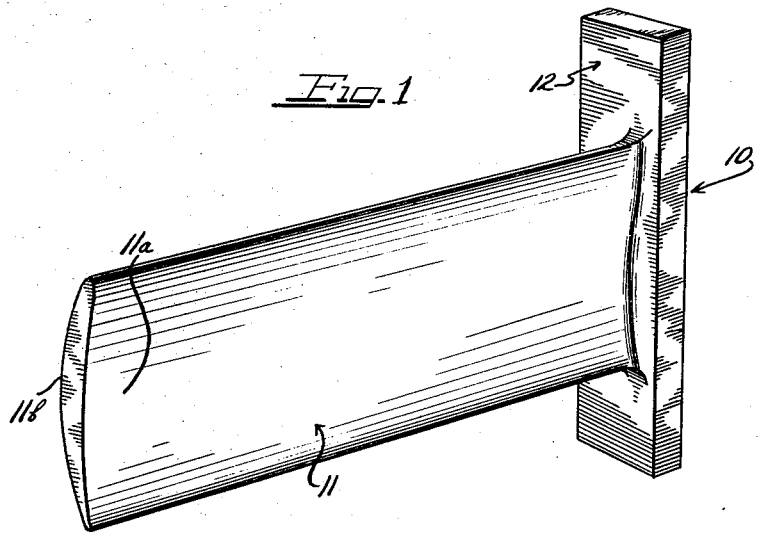
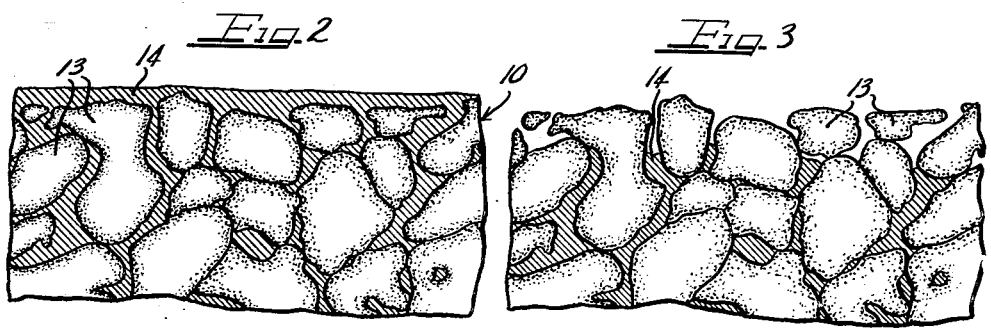
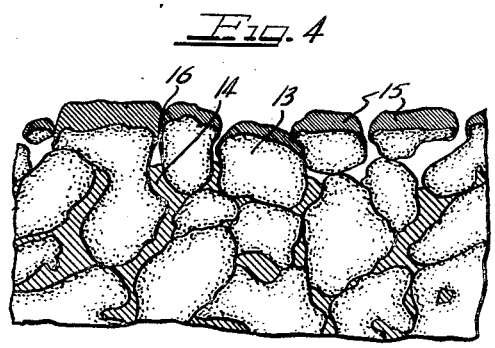
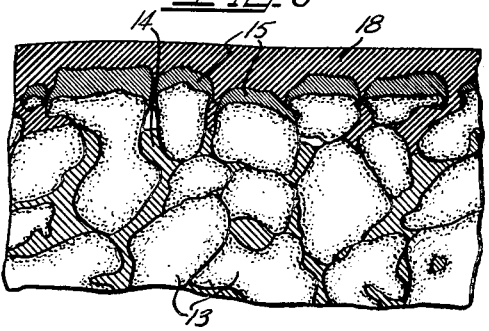
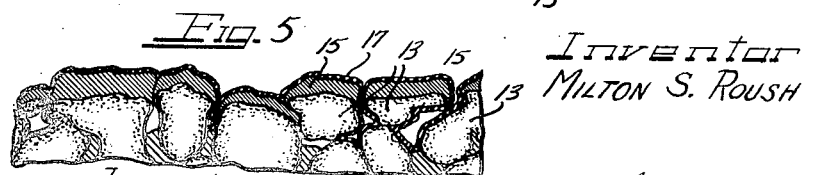
Inventor
MILTON S. ROUSH Patented Aug. 17, 1954

2,686,654

UNITED STATES PATENT OFFICE 2,686,654

COATED MEMBER AND METHOD OF MAKING THE SAME

Milton S. Roush, Painesville, Ohio, assignor to Thompson Products, Inc., Cleveland, Ohio, a corporation of Ohio Application October 19, 1948, Serial No. 55,420

9 Claims. (Cl. 253—77)

1

The present invention relates to the coating of metal surfaces with protective organosiloxane films and to members having such a surface. More particularly, this invention deals with the organosiloxane coating of metals which do not normally retain such coating wherein the non-adherent metal is provided with an intermediate layer of a metal to which organosiloxane films adhere tenaciously.

The organosiloxane polymers, commonly known as the "silicones," are long chain or cyclic organosilicon compositions in which organic groups are connected by carbon-silicon bonds to the silicon atoms of a silicon-oxygen network. The high molecular weight organosiloxane polymers are conventionally prepared by the hydrolysis and subsequent condensation of the corresponding organosiloxane halides or esters. The preparation of organosilicon halides and the hydrolysis and condensation of the halides to form the organosiloxane may, for example, be carried out in the manner described in United States Letters Patent No. 2,258,218 to Eugene G. Rochow.

Resins for coating metallic and other surfaces may be prepared by the co-hydrolysis and co-condensation in a suitable hydrocarbon solvent of a mixture of organosilicon halides containing differing organic constituents. For example, a suitable coating resin may contain dimethylsiloxane units, monomethylsiloxane units, and phenylmethylsiloxane units. The specific physical and chemical properties of the resin are dependent upon the proportions of ingredients and the degree of condensation of the copolymer.

I have found that closely adherent, smooth coatings capable of withstanding elevated temperatures may be obtained by the application of organosiloxane resin to surfaces of metals capable of forming adherent metal oxides, such as magnesium and aluminum. Such metals are hereinafter referred to as "receptive metals." Upon heating the organosiloxane resin-coated surface to a temperature on the order of from 230° to 320° C., the interfacial layer between the metal and the resin assumes the color of the metal oxide and it appears that the metal oxides tightly bond the coating to the metal surface through metal-oxygen linkages within the polymer. However, in the case of metals incapable of forming adherent metal oxides, the siloxane film is not tightly bonded to the metal surface, the film flakes and cracks at elevated temperatures, and the metal surface is said to be "non-receptive."

The organosiloxane film coatings have been found to be particularly desirable for coating fluid flow directing receptive surfaces suitable for use in turbine engines due to the non-wettability of the film, the smoothness, and the corrosion and erosion resistance of the siloxane layer. Since flow directing members formed of receptive metals must be manufactured by costly and complicated forging methods, it has been proposed that such members and particularly the air directing blades of the engine be fabricated from porous iron compacts formed to shape by powdered metal methods and infiltrated with copper to form a dense body structure. Due to the non-receptive character of both iron and copper, it has heretofore been impossible to coat such blades with a protective organosiloxane film.

The present invention now provides a method whereby an organosiloxane protective film may be applied to an article formed of a metal incapable of forming an adherent metal oxide. In accordance with the method of the present invention, the non-receptive metal surface is coated, as by electrodeposition or dipping, with a receptive metal. A layer of an organosiloxane polymer, preferably dispersed in a liquid medium, is then applied to the receptive metal surface, the polymer being subsequently cured and condensed by heating to form a continuous film tightly bonded to the non-receptive base metal by the receptive layer and the receptive metal.

As particularly applied to the coating of fluid flow directing members formed of a porous iron compact infiltrated with copper, the method of the present invention comprises the steps of etching copper from the surface and adjacent top surface layers of the infiltrated compact, forming a deposit of a receptive metal, such as cadmium, tin, zinc or aluminum, on the exposed iron surfaces, applying under reduced pressure a layer of an organosiloxane polymer to the exposed etched surfaces of the compact and to the receptive metal surface, and heating the siloxane coated member to cure the siloxane resin and to react the resin with the receptive metal surface. If desired, prior to curing the initial organosiloxane layer applied to the receptive metal surface, an additional organosiloxane layer may be applied to the article to provide an additional siloxane thickness presenting a smooth surface. The coated member thus provided comprises a body or base composed of non-receptive metal, a receptive metal layer deposited on the non-receptive surface, and an organosiloxane layer overlying the receptive metal surface, the organosiloxane polymer extending into the etched surface layers of the non-receptive surface and being firmly bonded to the receptive metal surface by an interfacial layer of receptive metal oxide.

It is, therefore, an important object of the present invention to provide a method for the application of adherent organosiloxane film to a metal article formed of a non-receptive metal.

It is another important object of the present invention to provide a method for firmly bonding an organosiloxane polymer to a non-receptive metal article by means of an interfacial layer of a receptive metal.

It is a further important object of the present invention to protect non-receptive metal surfaces with an organosiloxane polymer by applying a layer of a receptive metal to the non-receptive metal article, subsequently coating the receptive metal layer with an organosiloxane polymer and heating the coated surface to cure the polymer and to effect a reaction between the polymer and the receptive metal.

Another object of this invention is to provide an organosiloxane coated metal article in which the organosiloxane polymer is bonded to the article by means of an intermediate layer of a receptive metal deposited on the surface of the article and firmly bonded to the polymer by means of receptive metal-oxygen linkages within the polymer.

It is a still further important object of the present invention to provide a fluid flow directing member formed of a non-receptive metal enveloped within a protective organosiloxane film, the polymer being bonded to the fluid directing member by means of an intermediate layer of a metal capable of forming a tightly adherent metal oxide.

A specific object of the present invention is to provide a method for the coating of an air flow directing blade made of a porous iron compact and infiltrated with copper by etching copper from the blade surface, depositing a receptive metal selected from the group consisting of cadmium, tin, zinc and aluminum on the exposed iron blade surface, depositing a layer of organosiloxane polymer on the receptive metal surface, and heating the coated blade to bond the polymer to the receptive metal surface.

Other and further objects of this invention will be apparent from the disclosures in the specification and the accompanying drawings.

On the drawings:

Figure 1 is a perspective view illustrating a compressor blade such as that employed in a turbo-jet engine;

Figure 2 is a greatly magnified fragmentary view illustrating the structure of a copper infiltrated iron compact, such as the blade of Figure 1;

Figure 3 is a view similar to Figure 2 illustrating the structure of the compact following etching;

Figure 4 is a view similar to Figure 3 illustrating the structure of the etched compact following the deposition of a receptive metal thereon;

Figure 5 is a view similar to Figure 4 illustrating the structure of the compact of Figure 4 following the deposition of an organic siloxane polymer thereon under reduced pressure; and Figure 6 is a view similar to Figure 5 illustrating the structure following the application and curing of the outer organosiloxane layer.

As shown on the drawings:

In Figure 1, reference numeral 10 refers generally to an airflow directing blade suitable for use in a turbo-jet engine. The blade 10 comprises an airfoil vane section 11 and a root 12 for anchoring the blade in position in a turbo-jet engine compressor rotor or stator. The airfoil portion 11 has a concave face 11a and a convex face 11b appropriately shaped to effectively pack air into the engine. In addition, the airfoil portion 11 is twisted along its length, the faces 11a and 11b and the twist presenting a contour that is very difficult to manufacture and which heretofore could only be made by costly forging and machining operations followed by extensive polishing.

While satisfactory blades 10 can be made by powder metallurgy technique, it is also necessary to provide highly polished exterior surfaces on the vane faces 11a and 11b. By practicing the method herein disclosed, it is possible to readily and inexpensively manufacture blades having highly polished airfoil surfaces.

One particularly desirable method of inexpensively forming the blade 10 includes a combined powder metallurgy and infiltration technique wherein powdered iron is pressed to form a porous compact which may be sintered if desired. The compact is subsequently infiltrated with copper. Such an infiltered compact may be prepared by pressing to blade shape powdered iron, preferably free of carbon but, if desired, containing up to 1% carbon, at pressures ranging from 6 to 50 tons per square inch. If iron powder of suitable particle size, ranging from 80 to 325 mesh, is employed, a compact having a porosity ranging from 10 to 35% will be produced at these pressures. If the porosity of the compact is greater than 15%, it is desirable to sinter the compact at a temperature of 900° to 1100° C. for a period of from 30 minutes to 1 hour. If necessary, the porosity of the compact may be reduced to less than 15% by coining.

Following the formation of the porous iron compact, the compact is infiltrated with copper or a copper alloy to produce the desired dense body structure by contacting the porous shape with copper and heating in a dry protective atmosphere to a temperature greater than the melting point of copper or the copper alloy being employed. This heating may suitably be carried out by temperatures ranging from 1125° to 1150° C. for a period of from 10 to 15 minutes. While pure copper may be used for infiltrating, it is preferred to use a copper base alloy containing 2% to 8% manganese and 1% to 2% iron.

If desired, the infiltrated body may be subjected to suitable heat treatments, such as diffusion and precipitation or steel treatments, to superficially alloy the ferrous skeleton and copper network by diffusion. The dense body structure thus obtained is illustrated in Figure 2, in which reference numeral 13 designates the compacted iron particles and reference numeral 14 indicates the copper infiltrant therebetween.

In accordance with the method of the present invention, the infiltrated compact is etched, either electrolytically or chemically, to remove copper from the compact surface and adjacent layers to a depth ranging from approximately 0.002 to 0.01 inch. This etching may be desirably carried out by means of a combined chromic acid-sulphuric acid etching solution. A suitable solution, containing about 187.5 grams per liter of chromic acid and 1.88 grams per liter of sulphuric acid, may be prepared by diluting with water a dilute commercial chromium plating bath to 75% acid strength. As shown in Figure 3, this etching step results in the formation of a porous surface free of copper and presenting iron particles spaced at random at their etched surface.

Inasmuch as organosiloxane polymers do not adhere to either copper or iron at relatively elevated temperatures, it is desirable to provide a receptive metal surface overlying the iron surface of the metal compact to which the organosiloxane polymer may adhere. As shown in Figure 4, the provision of a receptive metal surface is carried out by depositing a receptive metal 15 onto the exposed iron particles constituting the article surface. Suitable receptive metals which may be easily applied to the iron surface are cadmium, zinc, tin and aluminum. A cadmium, zinc, or tin layer may suitably be deposited by conventional electroplating procedures or dipping, while I prefer to deposit aluminum by means of a hot aluminum dip process. Any receptive metal capable of forming an adherent metal oxide may be employed to anchor the polymer to the blade formed of non-receptive metal. However, the above named metals are preferred, due to their ease of application and the extremely adherent bond formed between these metals and organosiloxane polymers.

As shown in Figure 4, the receptive metal will be deposited on the exposed iron surfaces and will follow the outline of the exposed edges of these particles. If the grains of iron are closely spaced, as at 16, the receptive metal layer 15 will seal off the etched portion lying beneath the iron particles to leave a void. However, a majority of these openings will not be closed, and access to the underlying copper filtrant 14 will be provided by the etched cavities.

Following the deposition of the receptive metal layer 15 upon the surface of the article, the article is next heated to a temperature of greater than 100° C. and preferably 150° C. to dry the article surface. Following this heating step, the article, while still hot, is placed within a conventional vacuum chamber which is evacuated at a pressure of less than 1 mm. mercury to remove moisture from the article and to evacuate air from the surface pores formed by the etching step. While maintaining the article under vacuum, the article is contacted with suitable organosiloxane resin. For example, an organosiloxane resin containing dimethylsiloxane, monomethylsiloxane, and phenylmethylsiloxane structural units may be employed. Resins of this type are manufactured by Dow Corning Corporation under the trade name DC804. The resin employed in this step is preferably diluted to a solid content of 15% dispersed in suitable hydrocarbon solvent, such as toluene.

As illustrated in Figure 5, the silicone resin 17 may be deposited upon the receptive metal surface 15 and also deposited within the etched pores underlying the iron particles 13 forming the article surface. This penetration of the siloxane polymer dispersion is made possible by the evacuated condition of the etched pores and the free flowing characteristics of the 15% solids dispersion. As shown in Figure 5, the silicone forms films 17 following the contour of the metal 15 and uniformly distributed over the exposed receptive metal surfaces and lining the etched pores of the metal article.

Following the formation of siloxane layer 17, the vacuum is released and the coated article is removed from the vacuum chamber. Following this coating, the siloxane coated article may be cured as hereinafter described, but I prefer to apply a thicker organosiloxane coating, as illustrated at 18 in Figure 6, to provide a smoother coating. The application of the later coating is accomplished without curing the first siloxane coating 17, since I have found that the application and curing of a second layer to a cured condensed initial polymer layer will cause crazing upon drying and exposure to elevated temperatures. I prefer to dip in a suitable solvent, such as toluene, the coated article, as shown in Figure 5, to remove the silicone coating from the surface of the receptive metal layer 15. This dip does not remove the silicone layer lining the walls of the etched pores since the extremely small dimensions of these pores prevents the penetration of the solvent.

Following the toluene dip, the article surface is preferably sprayed or otherwise coated with a siloxane resin of the same composition as the layer 17, although if desired a different resin composition may be employed. I prefer to employ a more concentrated dispersion of siloxane for the later coating 18, preferably a dispersion containing from 30% to 60% resin solids. The completed coating 18 should be less than 0.004 inch thick and preferably on the order of 0.001 inch thick.

I have found that coatings of greater thickness than 0.004 inch craze upon subjection to elevated temperatures and that a coating less than 0.001 inch thick becomes porous and less solvent and corrosion resistant. It is to be noted in Figure 6 that the coating 18 penetrates and fills the etched cavities outlined by the preliminary layer 16. This filling of the etched pores is possible because of the substantially identical composition of the two coatings dissolved in the same solvent so that the preliminary coating is wet by the compatible coating later applied.

Following the application of the layer 17, the coated article is preferably air dried for a period of time sufficient to substantially remove the hydrocarbon solvent from the coating. If desired, this air drying step may be carried out at an elevated temperature, although I prefer to air dry the coated article at room temperature for a period of approximately three hours. Following this air drying step, a coated article is subjected to baking in a substantially solvent free condition, thus avoiding bubbling, blisters, etc.

After the air drying, the coated article is preferably subjected to a preliminary baking for a period of about 1 hour at a temperature of from 150° to 200° C., and preferably at a temperature of approximately 190° C. The preliminary baking effects a partial fusion of the polyorganosiloxane polymer to give a more compact coating and prevents the damaging of the coating upon suddenly subjecting the coated article at room temperature to the relatively high baking temperatures subsequently employed.

In general, it is desirable to bake the coating at a temperature above the highest temperature to be encountered in operation of the article. In a multi-stage axial flow air compressor operating at a compression ratio of 5 to 1, as in turbo-jet engines, the highest temperature to which any of the blades in the compressor will be subjected is approximately 254° C. plus the temperature of the incoming air. I have found, however, that curing at a temperature of about 260° C. is generally sufficient, since following curing at this temperature the coating will not become tacky, even upon severe heating at greatly elevated temperature. The minimum temperature at which the improved coating of the present invention may be obtained is approximately 230° C. and a maximum temperature which I prefer to employ is approximately 320° C. The baking temperature should be maintained for a period of about 6 to 12 hours for optimum results.

I have found that the advantages residing in the coating of an air directing member with an organosiloxane by the method of the present invention are three-fold. First, such a member coated with an organosiloxane as herein defined possesses an improved, smooth finish making possible the initial formation of the blade to a good airfoil section without particularly regarding the smoothness of the blade surface. The coating herein provided is extremely thin, on the order of 0.001 inch in thickness, smooth, and follows the contour of the surface to which it is applied. Second, the member is protected from corrosion under deleterious conditions, such as exposure to salt-laden air and lubricating oils. Thirdly, the film is not wet by fluids such as water, oil, or air. The non-wettability of the siloxane coated blade results in a surprising increase in efficiency of the turbine in which the blades are employed. The coated members are more resistant to icing than metal surface members and also are free from deposits formed by the building up upon the blade surface decomposition products of lubricating oil employed in the engine. The non-wettability by air of the coated fluid directing surfaces reduces bubbling and turbulence upon rapid movement of air passing through the engine in contact with the surface.

As a specific example from the method of the present invention, particularly applied to the coating of a compressor blade, such as illustrated in the drawings, the following data is presented:

Test blades about 1¾ inches in length and 1¼ inches in width were prepared from an electrolytic iron powder by pressing at about 15 tons per square inch. The powder consisted of 4 parts by weight of an electrolytic iron powder of a particle size corresponding to minus 100 mesh and 1 part by weight of an electrolytic iron powder having a size of minus 325 mesh. The compact had a porosity of about 25% and was heated in contact with pure copper in an infiltration furnace in an atmosphere of purified dry cracked ammonia. The compact and copper were raised to a temperature of about 1200° C. to melt the copper so that the porous compact was infiltrated. The materials were maintained at infiltration temperature for 15 minutes and the composite body was cooled in the furnace. The body contained approximately 75% by weight iron and 25% by weight copper.

The infiltrated blade was next etched with a mixture of chromic and sulphuric acids containing about 188. grams per liter chromic acid and 1.9 grams per liter sulphuric acid. Following the etching, the blade was cadmium plated in a conventional cadmium plating bath containing an aqueous solution of 23 grams per liter cadmium oxide and 86 grams per liter sodium cyanide. Soluble cadmium anodes were employed in the plating bath and the effective current density was 18 amperes per square foot. Following the cadmium plating step, the plated blade was dipped in 5% by weight aqueous chromium acid solution to neutralize the alkali from the plating bath. The cadmium coated blade was next heated at a temperature of 150° to dryness and then placed within a vacuum chamber and evacuated to a pressure of 1 mm. mercury. The blade was maintained under vacuum until testing showed that all air was exhausted from the edge pores of the piece. This testing was carried out by closing the outlet from the vacuum chamber to the pump and noting any pressure drop. If a pressure drop occurred, it indicated that the pores were not completely evacuated. As soon as a steady reading of 1 mm. mercury was obtained, an organosiloxane coating resin containing 15% resin solids by weight dispersed in toluene was admitted to the vacuum chamber. The resin contained dimethylsiloxane, monomethylsiloxane, and phenylmethylsiloxane structural units. Following the coating of the blade, the vacuum was released and the coated blade was dipped in toluene to remove the organosiloxane polymer from the blade surface.

Following removal from the toluene dipping bath, the blade was sprayed with a resin dispersion containing 35% resin solids dispersed in toluene, the amount of polymer sprayed on the blade being sufficient to form a coating of approximately 0.001 inches in thickness upon curing. The coated article was air dried for 3 hours at room temperature, pre-baked for 1 hour at 190° C., and subjected to a final baking for twelve hours at 260° C. Under actual operating conditions, the blade prepared as above described was found to possess amazing erosion and corrosion resistant properties, to adhere tenaciously to the blade surface, and to possess desirable surface smoothness.

Blades prepared as above described were also plated with zinc from a zinc plating bath and with tin from a tin plating bath. A similar blade was also coated with aluminum by means of a conventional hot dip treatment.

Each of the above blades coated with zinc, tin or aluminum was coated with organosiloxane polymer as above described. These test blades were also found to possess the desirable characteristics of erosion and corrosion resistance, non-wettability, coating adherence, and surface smoothness.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. The method of coating an iron compact infiltrated with copper which comprises etching the surface of said article to remove copper to a depth of from 0.002 to 0.01 inch, depositing a receptive metal selected from the group consisting of cadmium, zinc, tin and aluminum over the etched surface, applying a first layer of an organo-siloxane polymer to the receptive metal layer, subsequently applying a second layer of an organo-siloxane polymer to said first layer without curing said first layer, the combined thickness of said first and second layers being less than 0.004 inch, and then heating the coated article to a temperature of at least 230° C. to cure the layers and bond the coating to the article through the formation of an interfacial receptive metal oxide firmly bonding said polymer to said metal by metal-oxygen linkages with said polymer.

2. A coated metal body of compacted iron particles infiltrated with copper, said body having an iron surface substantially free from copper, a film of a receptive metal selected from the group consisting of cadmium, zinc, tin and aluminum over the iron surface, a film of organo-siloxane polymer over said receptive metal film, a film of a metal oxide of said receptive metal between said organo-siloxane polymer film and said receptive metal film, and an interfacial layer between said organo-siloxane polymer film and said metal oxide film composed of a reaction product of the receptive metal and the polymer and including metal-oxygen linkages with the polymer.

3. The method of forming a protective organosiloxane polymer coating bonded by metal-oxygen linkages to a non-receptive metal compact which comprises etching a porous iron compact infiltrated with copper to remove copper from the surface thereof and form an irregular surface composed of iron particles, applying to said irregular surface a metal receptive to said polymer and selected from the group consisting of cadmium, zinc, tin and aluminum, limiting the thickness of said layer to provide an irregular coating following the contour of the exposed iron particles, coating an organosiloxane polymer onto said layer, removing the polymer coating from the surface of the compact to leave a polymer coating only in the pores of the compact, applying a second coating of the organosiloxane polymer to form a continuous film of the desired thickness on the compact, and heating the thus coated compact to cure the polymer and form a smooth uncrazed surface bonded to the receptive metal through metal-oxygen linkages.

4. The method of forming a smooth protective coating on a copper infiltrated porous iron compact which comprises etching the compact to remove copper from the surface thereof and provide an irregular surface composed of iron particles, applying a thin layer of a metal selected from the group consisting of cadmium, zinc, tin and aluminum to the exposed iron particles, limiting the thickness of said layer to cause the layer to follow the uneven surfaces of said particles and provide an irregular covering layer, applying a layer of an organosiloxane resin to the metal-coated irregular surface of the compact, and heating the organosiloxane-coated compact to cure the resin and form an interfacial metal oxide film including metal-oxygen linkages with the resin.

5. The method of coating a copper infiltrated iron compact with an organo-siloxane resin which comprises etching the compact to remove copper from the surface and adjacent areas thereof, applying a metal receptive to the resin and selected from the group consisting of cadmium, zinc, tin and aluminum to the etched surface, evacuating the receptive metal-coated compact to remove moisture and air from the pores thereof, applying a layer of an organosiloxane resin to the evacuated compact, removing the portions of said layer on the surface of the compact without removing the layer from the walls of the pores of the compact, applying a second layer of an organosiloxane resin to fill the pores and form a continuous film on the compact, and baking the thus coated compact at temperatures between 230° to 320° C. to create metal-oxygen linkages between the resin and the receptive metal.

6. The method of forming a non-wettable, smooth airfoil contour on an airflow-directing member composed of copper infiltrated iron particles which comprises etching the member to remove the copper from the surface of the member and create an irregular surface of exposed iron particles, applying a metal selected from the group consisting of cadmium, zinc, tin and aluminum to the exposed iron particles for forming an irregular surface following the contour of the particles, evacuating the metal-coated member to remove air and moisture from the pores thereof, applying a layer of an organosiloxane polymer to the evacuated member to follow the contour of the metal coating, drying said polymer layer, covering the thus dried layer with a second layer of the organosiloxane polymer to form a smooth continuous coating, drying the second layer, and baking the multi-coated member to temperatures of from 230° to 320° C. for a period of about 6 to 12 hours to thereby form a smooth finish resistant to salt-laden air and lubricating oils, and incapable of being wet by water or oil, said surface being bonded to the metal coating by metal-oxygen linkages.

7. The method of forming a protective organosiloxane polymer coated infiltrated powdered metal article composed of metal which is not receptive to the polymer which comprises etching the infiltrant metal out of the surface area of the article to leave the powdered metal particles exposed for forming an irregular surface, applying to said exposed particles metal selected from the group consisting of cadmium, zinc, tin and aluminum to cover and follow the contour of the outer faces of the particles without penetrating into the pores therebetween, covering the thus coated particles with an organosiloxane polymer which also extends into said pores, and heat curing the polymer to react the receptive metal with the polymer whereby a protective coating is formed anchored in the pores and bonded to the receptive metal-coated outer surfaces of the powdered metal particles.

8. A fluid-directing member which comprises a copper infiltrated iron compact having an irregular surface composed of iron particles substantially free from copper, a coating of a receptive metal on the exposed iron particles selected from the group consisting of cadmium, zinc, tin and aluminum, said coating following the irregular surface of said iron particles and being anchored thereto, a film of an organosiloxane polymer covering said receptive metal coating and providing a smooth exterior surface on said compact, and an interfacial layer between said organosiloxane polymer film and said receptive metal coating composed of a reaction product of the receptive metal and the polymer and including metal-oxygen linkages with the polymer.

9. A turbine blade which comprises a copper infiltrated iron compact, said compact having an irregular surface composed of iron particles and being free from copper to a depth of from 0.002 to 0.01 inch, a thin film of a receptive metal selected from the group consisting of cadmium, zinc, tin and aluminum bonded to said iron particles and covering the exposed surfaces thereof, said film being sufficiently thin to follow the irregular contour of the exposed iron particles and provide an irregular surface, a film of an organosiloxane polymer over the receptive metal and following the irregularities thereof, said organosiloxane polymer film having a smooth exterior continuous surface, a metal oxide film between the polymer film and the receptive metal, and an interfacial layer between the organosiloxane polymer film and the metal oxide film composed of a reaction product of the receptive metal and the polymer and including metal-oxygen linkages with the polymer.

References Cited in the file of this patent

UNITED STATES PATENTS

| Number | Name | Date |
|---|---|---|
| 776,518 | Junggren | Dec. 6, 1904 |
| 996,855 | Hodgkinson | July 4, 1911 |
| 1,608,694 | Cain | Nov. 30, 1926 |
| 1,651,278 | Humphries | Nov. 29, 1927 |
| 1,800,730 | Holzwarth | Apr. 14, 1931 |
| 2,394,816 | Soday | Feb. 12, 1946 |
| 2,459,018 | De Monte et al. | Jan. 11, 1949 |
| 2,494,920 | Warrick | Jan. 17, 1950 |
| 2,553,362 | Dannenberg | May 15, 1951 |

FOREIGN PATENTS

| Number | Country | Date |
|---|---|---|
| 432,386 | Great Britain | July 25, 1935 |